United States Patent
Iyer et al.

(10) Patent No.: US 11,423,860 B2
(45) Date of Patent: *Aug. 23, 2022

(54) MITIGATION OF SCREEN BURN-IN FOR A FOLDABLE IHS

(71) Applicant: Dell Products, L.P., Round Rock, TX (US)

(72) Inventors: Vivek Viswanathan Iyer, Austin, TX (US); Philip M. Seibert, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/318,294

(22) Filed: May 12, 2021

(65) Prior Publication Data

US 2021/0264870 A1     Aug. 26, 2021

Related U.S. Application Data

(63) Continuation of application No. 16/421,176, filed on May 23, 2019, now Pat. No. 11,043,183.

(51) Int. Cl.
*G09G 5/00* (2006.01)
*G09G 5/36* (2006.01)
(Continued)

(52) U.S. Cl.
CPC .......... *G09G 5/003* (2013.01); *G06F 1/1616* (2013.01); *G06F 1/1641* (2013.01);
(Continued)

(58) Field of Classification Search
CPC .......... G09G 5/003; G09G 5/363; G09G 5/38; G09G 2354/00; G09G 2380/02;
(Continued)

(56) References Cited

U.S. PATENT DOCUMENTS

7,440,006 B2 * 10/2008 Lin ...................... H04N 7/0122
        348/556
9,639,177 B2 *  5/2017 Kim ...................... G09G 5/003
(Continued)

*Primary Examiner* — Ricardo Osorio
(74) *Attorney, Agent, or Firm* — Fogarty LLP (57) ABSTRACT

Certain IHSs (Information Handling Systems) may utilize displays that are foldable. Foldable displays may utilize OLED (organic light-emitting diode) display technology, which is particularly susceptible to screen burn-in. Embodiments implement procedures for mitigation of screen burn-in of a foldable display. When folded, a foldable display is logically divided into screen portions based on the locations of the folds. Embodiments mitigate screen burn-in separately in each these screen portions that are created by folding the display. A gap may be displayed along the length of the folds of a folded display, thus separating the different screen portions. Embodiments may implement procedures for mitigating screen burn-in from displaying such a gap. Embodiments may also determine screen portions of a folded display that are actively in use and may implement procedures for mitigating screen burn-in in inactive portions of the folded display.

17 Claims, 6 Drawing Sheets

(51) Int. Cl.
    G09G 5/38      (2006.01)
    G06F 3/01      (2006.01)
    G06F 1/16      (2006.01)
(52) U.S. Cl.
    CPC ............ *G06F 1/1681* (2013.01); *G06F 3/013* (2013.01); *G09G 5/363* (2013.01); *G09G 5/38* (2013.01); *G09G 2354/00* (2013.01); *G09G 2380/02* (2013.01)
(58) Field of Classification Search
    CPC .... G06F 1/1616; G06F 1/1641; G06F 1/1681; G06F 3/013
    See application file for complete search history.

(56) References Cited

U.S. PATENT DOCUMENTS

| | | | | |
|---|---|---|---|---|
| 10,452,106 | B2* | 10/2019 | Cho | G06F 1/1647 |
| 10,558,277 | B2* | 2/2020 | Henell | G06F 3/0346 |
| 11,043,183 | B2* | 6/2021 | Iyer | G09G 5/363 |
| 2005/0237345 | A1 | 10/2005 | Mizumaki | G09G 5/397 345/690 |
| 2007/0266345 | A1* | 11/2007 | Cok | G09G 3/3216 715/867 |
| 2009/0027306 | A1* | 1/2009 | Kawabe | H04W 52/027 345/3.1 |
| 2010/0064536 | A1* | 3/2010 | Caskey | G06F 1/1677 33/303 |
| 2010/0125819 | A1* | 5/2010 | Sudhakar | G06F 3/0481 715/867 |
| 2010/0225601 | A1* | 9/2010 | Homma | G06F 3/0416 345/173 |
| 2011/0095974 | A1* | 4/2011 | Moriwaki | G09G 3/007 345/156 |
| 2011/0216064 | A1* | 9/2011 | Dahl | G06F 1/1677 345/428 |
| 2012/0243165 | A1* | 9/2012 | Chang | G06F 1/1647 361/679.27 |
| 2014/0002365 | A1* | 1/2014 | Ackley | G06F 3/1438 345/168 |
| 2015/0116362 | A1* | 4/2015 | Aurongzeb | G06F 1/1677 345/650 |
| 2015/0205946 | A1* | 7/2015 | Aurongzeb | G06F 3/0346 726/19 |
| 2015/0331593 | A1* | 11/2015 | Lee | G06F 1/1677 345/667 |
| 2016/0321969 | A1 | 11/2016 | Kambhatla | G09G 3/003 |
| 2018/0039410 | A1* | 2/2018 | Kim | G06F 1/1677 |
| 2018/0061344 | A1* | 3/2018 | Kurokawa | G09G 3/3648 |
| 2018/0088699 | A1* | 3/2018 | Dao | G09G 3/035 |
| 2018/0173276 | A1* | 6/2018 | Kummer | H04M 1/0235 |
| 2020/0035204 | A1* | 1/2020 | Wu | G09G 5/14 |
| 2020/0264699 | A1* | 8/2020 | Leland | G06F 1/1677 |
| 2020/0365110 | A1* | 11/2020 | Iyer | G06F 1/1652 |
| 2021/0049940 | A1* | 2/2021 | Azuma | H01L 27/32 |

* cited by examiner

MITIGATION OF SCREEN BURN-IN FOR A FOLDABLE IHS

CROSS REFERENCE TO RELATED APPLICATIONS

This patent application claims priority to, and is a continuation of co-pending, commonly assigned U.S. patent application Ser. No. 16/421,176, filed May 23, 2019 and also entitled "Mitigation of Screen Burn-In for a Foldable IHS."

FIELD

This disclosure relates generally to Information Handling Systems (IHSs), and more specifically relates to IHSs utilizing foldable displays.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may provide visual outputs to users via various types of integrated and external displays. Until recently, the displays used by IHSs have only been flat, rigid displays. Certain IHSs now utilize foldable displays allowing the display, and in certain instances the IHS, to be folded. Foldable displays provide for easier transport and storage of an IHS. In some instances, foldable IHSs may remain operational while fully unfolded and also while partially unfolded. Certain foldable IHSs incorporating foldable displays may also provide processing, memory, networking and other I/O capabilities that allow the foldable IHS to be used as a standalone system and may thus be used in a variety of operating scenarios ranging from use as a laptop to use as a handheld.

In certain instances, the displays utilized by IHSs may be affected by screen burn-in results from the prolonged display of static content. For instance, the prolonged display of a non-moving image, such as a channel logo displayed during television programming, may result in the image being permanently imprinted in the display, or may reduce the image quality that may be supported by the affected pixels of the display. Techniques such as screensavers may be used to randomize the content that is displayed during intervals when the IHS is not being actively used. Different display technologies vary in their susceptibility to screen burn-in.

SUMMARY

In various embodiments, an Information Handling System (IHS) includes: a foldable display folded along a folded portion into a first screen portion and a second screen portion; a logic unit configured via firmware instructions to determine a posture of the IHS; and a processor configured via software instructions to: determine, based on the posture, content to display in the first screen portion and in the second screen portion; select a pattern to display as a gap between the first screen portion and the second screen portion; display the selected pattern along the folded portion of the foldable display, wherein the displayed pattern creates the gap between the first screen portion and the second screen portion; and periodically modify the pattern that is displayed to create the gap between the first screen portion and the second screen portion.

In additional IHS embodiments, the periodic modification of the pattern prevents permanent imprinting of the displayed gap in the pixels along the folded portion of the foldable display. In additional IHS embodiments, the pattern is modified by randomly modifying a display output of pixels of the foldable display that display the pattern. In additional IHS embodiments, the modifications of the display output of the pixels are selected to be imperceptible to a user viewing the foldable display. In additional IHS embodiments, the pattern is modified via selection of patterns from a cyclic buffer of available patterns. In additional IHS embodiments, the patterns are selected from the cyclic buffer at a frequency that is matched to the frame refresh rate of the foldable display.

In various additional embodiments, an Information Handling System (IHS) includes: a foldable display folded along a folded portion into a first screen portion and a second screen portion; a logic unit configured via firmware instructions to determine a posture of the IHS; and a processor configured via software instructions to: determine, based on the posture, content to display in the first screen portion and in the second screen portion; designate the first screen portion or the second screen portion as an active screen portion based on detected user activity; designate as an inactive screen portion the first screen portion or the second screen portion that is not designated as the active screen portion; and periodically shift the content displayed in the inactive screen portion.

In additional IHS embodiments, the logic unit is further configured by the firmware instructions to detect the user activity and determine whether the user activity is directed at the first screen portion or the second screen portion. In additional IHS embodiments, the logic unit is further configured to detect a gaze of the user. In additional IHS embodiments, the logic unit is further configured to determine whether the user activity is directed at the first screen portion or the second screen portion based on a direction of the gaze of the user. In additional IHS embodiments, the direction of the gaze of the user is determined based on images captured by a camera of the IHS. In additional IHS embodiments, the processor is further configured via software instructions to initiate a first graphics process for display of content in the first screen portion and to initiate a second graphics process for display of content in the second screen portion.

In various additional embodiments, a method mitigates screen burn-in of a foldable display of an IHS (Information Handling System), wherein the foldable display is folded along a folded portion into a first screen portion and a second screen portion, the method includes: determining content to display in the first screen portion and in the second screen portion; selecting a pattern to display as a gap between the first screen portion and the second screen portion; displaying the selected pattern along the folded portion of the foldable display, wherein the displayed pattern creates the gap between the first screen portion and the second screen portion; and periodically modifying the pattern that is displayed to create the gap between the first screen portion and the second screen portion.

In additional embodiments, the method further includes: designating the first screen portion or the second screen portion as an active screen portion based on detected user activity; designating as an inactive screen portion the first screen portion or the second screen portion that is not designated as the active screen portion; and periodically shifting the content displayed in the inactive screen portion. In additional embodiments, the method further includes determining whether the user activity is directed at the first screen portion or the second screen portion. In additional embodiments, the method further includes: detecting a gaze of the user; and determining whether the user activity is directed at the first screen portion or the second screen portion based on a direction of the gaze of the user. In additional embodiments, the method further includes initiating a first graphics process for display of content in the first screen portion; and initiating a second graphics process for display of content in the second screen portion. In additional method embodiments, the pattern is modified by randomly modifying a display output of pixels of the foldable display that display the pattern. In additional method embodiments, the pattern is modified via selection of patterns from a cyclic buffer of available patterns. In additional method embodiments, the patterns are selected from the cyclic buffer at a frequency that is matched to the frame refresh rate of the foldable display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
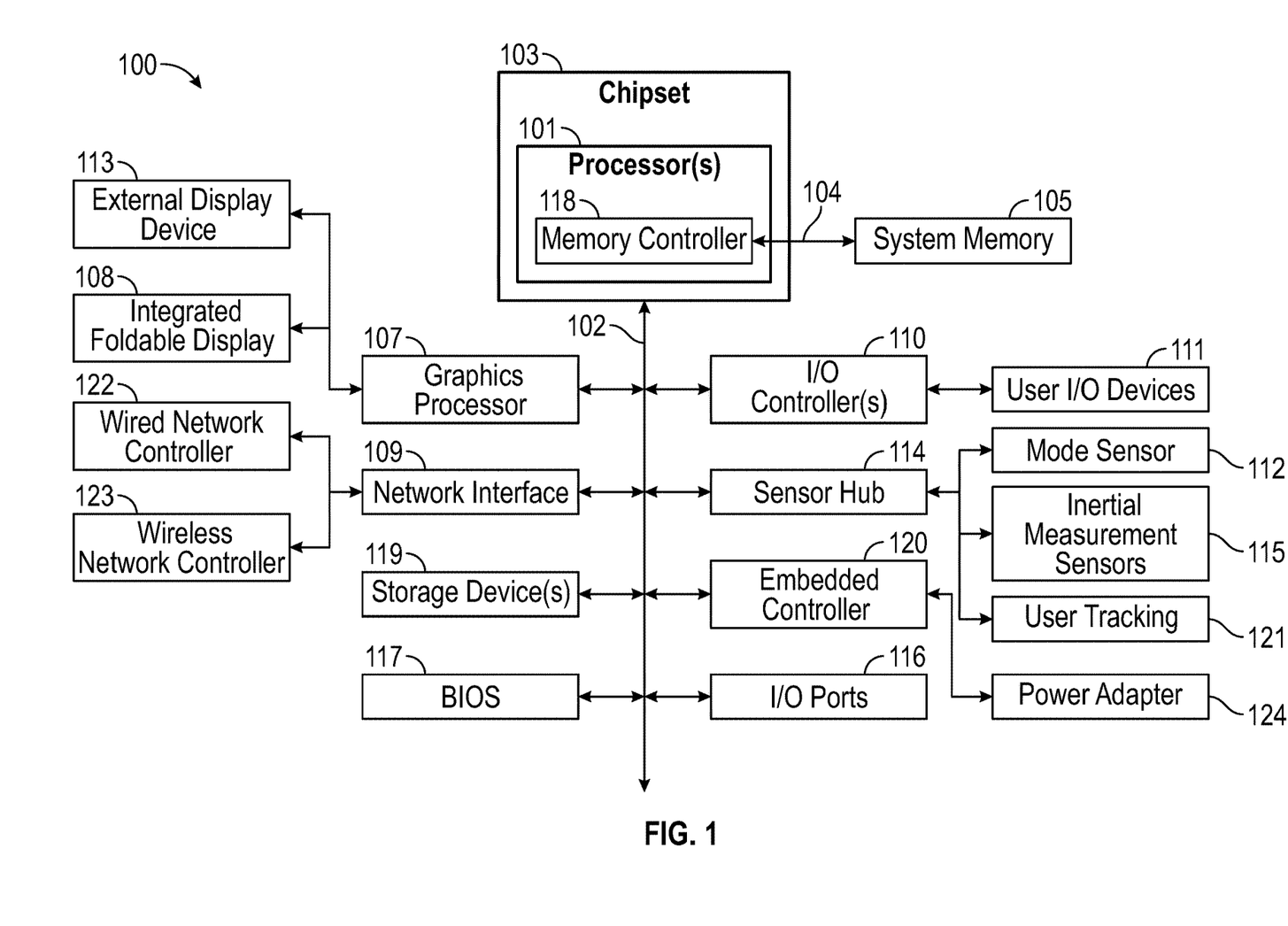
FIG. 1 is a block diagram depicting certain components of an IHS utilizing a foldable display and configured according to various embodiments for mitigation of screen burn-in the foldable display.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, internal and external displays used by IHSs may suffer from screen burn-in due to prolonged display of non-moving, static content. Also as described, certain IHSs may utilize displays that are foldable. In certain instances, foldable displays utilize OLED (organic light-emitting diode) display technology. Different display technologies are susceptible to screen burn-in to varying degrees and OLED displays are particularly susceptible to screen burn-in. Accordingly, embodiments may implement procedures for mitigation of screen burn-in of a foldable display. When folded, a foldable display may be logically divided into different screen portions based on the locations of the folds. Embodiments may mitigate screen burn-in in different of these screen portions created by folding of a display.

FIG. 1 is a block diagram illustrating certain components of an IHS 100 configured according to certain embodiments for mitigation of screen burn-in of a foldable display 108 of the IHS 100. In various embodiments, IHS 100 may include an embedded controller 120, graphics processor 107 and a sensor hub 114 that may each executes program instructions that cause these components to perform certain of the operations disclosed herein. As described in additional detail with regard to FIGS. 3A-D, IHS 100 includes an integrated foldable display 108 that may be configured to operate according to different screen modes that may utilize a gap that divides the foldable display into separate portions, where the gap may be displayed along the length of the folded portion of the display.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. In certain embodiments, power to processor 101 and/or system memory 105 may be turned off, or configured to operate at a minimal power level, in response to IHS 100 entering a low-power operating state.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and by wireless network controller 123. Each network controller 122, 123 may be coupled via various buses to the chipset 103 of IHS 100 in supporting different types of network connectivity, such as the network connectivity utilized by the operating system of IHS 100.

Chipset 103 may also provide access to an integrated foldable display 108 and one or more external displays 113 via a graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 utilized by IHS 100.

The IHS 100 utilizes an integrated display device 108 that is a foldable display, allowing the user to fold the display to a closed position, or to a partially open or a fully open position. As described in additional detail with regard to the below embodiments, based on the configuration in which IHS 100 is folded, IHS 100 may be used in different screen modes that may logically divide the folded display along the folds. In certain embodiments, the integrated foldable display device 108 may utilize OLED (organic light-emitting diode) technology, or another display technology that supports flexible displays that may be folded as described herein. In certain embodiments, the integrated foldable display 108 may be capable of receiving touch inputs such as via a touch controller that may be an embedded component of the foldable display device 108, graphics processor 107 or a separate component of IHS 100 accessed via bus 102. In certain embodiments, IHS 100 may also support use of one or more external displays 113, such as external monitors that may be coupled to IHS 100 via various types of wired and wireless connections.

As described, display devices may be susceptible to screen burn-in to varying degrees based on the display technology used by a device. In many instances, foldable displays utilize OLED (organic light-emitting diode) technology. Such OLED displays are particularly susceptible to screen burn-in, especially in comparison to displays utilizing standard LED display technology. As described in additional detail below, embodiments provide techniques for mitigating screen burn-in for foldable displays, such as the foldable display device 108 that may utilize OLED technology.

Other components of IHS 100 may include one or more I/O ports 116 that support removeable couplings with various types of peripheral external devices and systems. For instance, I/O 116 ports may include USB (Universal Serial Bus) Type-C ports, by which a variety of external devices may be coupled to IHS 100. I/O ports 116 may include various types of ports and couplings that support connections with external devices and systems through temporary couplings via ports accessible to a user via the enclosure of the IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, chipset 103 may utilize one or more I/O controllers 110 that may each support hardware components such as user I/O devices 111. Such I/O devices 111 may be integrated components of IHS 100 or the I/O devices 111 may be external components that may be temporarily coupled to IHS 100. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections.

As illustrated, certain IHS 100 embodiments may utilize a sensor hub 114 or other logic unit capable of determining the relative orientation and/or movement of IHS 100 based on various sensor inputs. For instance, sensor hub 114 may utilize inertial movement sensors 115, that may include accelerometer, gyroscope and magnetometer sensors capable of determining the current orientation and movement of IHS 100 (e.g., IHS 100 is motionless on a relatively flat surface or IHS 100 is being moved irregularly and is likely being held by a user). In certain embodiments, sensor hub 114 may also include capabilities for determining a location and movement of IHS 100 based on triangulation of network signals and based on network information provided by the operating system or by a network interface 109. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 to provide an indication of a user's presence in proximity to IHS 100. For instance, in certain embodiments, sensor hub 114 may indicate whether a user is currently facing a portion of the integrated foldable display 108 and is thus in a position to utilize IHS 100.

As described, IHS 100 utilizes a foldable display 108 that may be folded such that the display may be logically divided into distinct portions along the folds of the display. In certain embodiments, sensor hub 114 may support various techniques for tracking user activity in order to identify when a user is actively using the IHS 100 and, more particularly, when a user is actively using a particular portion of a foldable display 108. In certain embodiments, sensor hub 114 may utilize a user tracking 121 capability that tracks the gaze of the user. For instance, sensor hub 114 may access a camera device of IHS 100 in order to capture images of the user and to determine the direction of the user's gaze. Based on such gaze direction information, sensor hub 114 may determine whether a user is viewing a particular portion of a foldable display. In certain embodiments, sensor hub 114 may additionally or alternatively utilize various other inputs for determining the portion of a folded display that is in active use. For instance, sensor hub 114 may further deduce the portion of a folded display that is actively in use based on the user's mouse, keyboard, voice, touchscreen or other inputs.

Through folding of display 108 at different angles about a hinge or other folding mechanism, multiple different configurations for using the IHS 100 may be supported. As described in additional detail with regard to FIGS. 3A-D, an IHS utilizing a foldable display may be configured for use as a single-screen display or as a dual-screen display that splits the foldable display into two virtual displays along the length of the fold of the display. When folded in such a manner, the IHS 100 may be physically configured for use in different modes or postures. In certain embodiments, sensor hub 114 may include a mode sensor 112 that provides a determination of the current mode in which the IHS 100 is physically configured. Such determinations may be made by the sensor hub 114 based on movement and orientation information provided by the inertial movement sensors 115 and further based on the angle at which the hinge, or other folding mechanism, is currently folded.

Sensor hub 114 may utilize a mode sensor 112 that determines the current angle of the hinge and thus the angle at which the display 108 is currently folded. Based upon this angle of rotation of a hinge from a closed position, the sensor hub 114 may determine the mode in which the IHS 100 is configured. For instance, a first range of angles of rotation from a closed position may indicate a book configuration and a second range of angles may indicate a fully open configuration that may be oriented in a landscape or portrait orientation. The sensor hub 114 may additionally utilize orientation and movement information to determine the mode in which the IHS 100 is physically configured. For instance, if the sensor hub 114 determines the IHS 100 is configured with a hinge angle indicating use in a book mode, but the IHS 100 is oriented such that one portion rests on a flat surface and, due to the fold, the other portion is pointed upwards, the IHS may be determined to be in a laptop configuration. If the IHS 100 is determined to be tiled towards a user's face and is experiencing slight movement, the sensor hub 114 may determine with relative certainty that the IHS 100 is being used in a book configuration. In this same manner, the sensor hub 114 may utilize movement and orientation information to confirm that an unfolded IHS 100 is immobile and resting on a flat surface and is thus likely being used in fully open posture.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the mode sensor 112, inertial measurement sensors 115 and sensors used for determining a user's presence near the IHS 100. Sensor hub 114 may collect and processes data from such sensors using data fusion techniques in order to determine the posture in which the IHS 100 is currently positioned.

As illustrated, IHS 100 embodiments may utilize an embedded controller 120 that may be a motherboard component of IHS 100 and may include one or more logic units. Firmware instructions utilized by embedded controller 120 may be used to operate a secure execution environment that may include operations for providing various core functions of IHS 100, such as power management, docking, management of operating modes in which IHS 100 may be physically configured and support for certain integrated I/O functions. In certain embodiments, embedded controller 120 may implement operations for interfacing with a power adapter 124 in managing power for IHS 100. Such operations may be utilized to determine the power status of IHS 100, such as whether IHS 100 is operating from battery power or is plugged into an AC power source.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
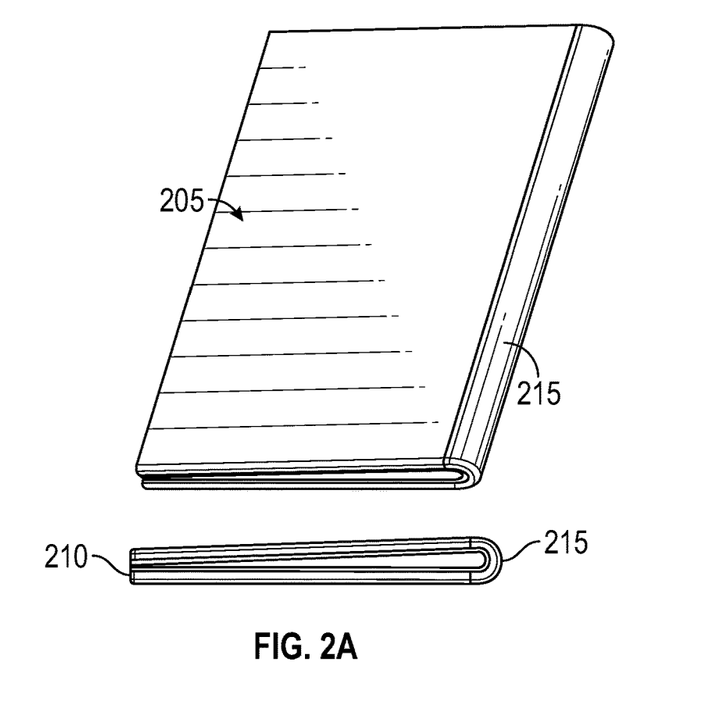
FIG. 2A is an illustration of a foldable IHS that is physically configured in a closed posture.

FIG. 2A is an illustration of a foldable IHS that is physically configured in a closed posture. As illustrated, a foldable IHS may be closed in a similar manner to a book or binder such that the IHS is divided into two portions along a central fold 215. The outer surface 205 of the foldable IHS may be an enclosure constructed of various types of plastic and/or metallic compounds. When folded as illustrated, the foldable display is protected within the closed outer surface 205, thus safeguarding the foldable display for transport or storage. In the profile view 210 of the closed posture, the two portions of the foldable IHS are rotated towards each other about the central fold 215 to their fullest extent. In certain instances, the central fold 215 may include a hinge that allows the two portions of the IHS to be folded and unfolded by a user.

Figure 2B:
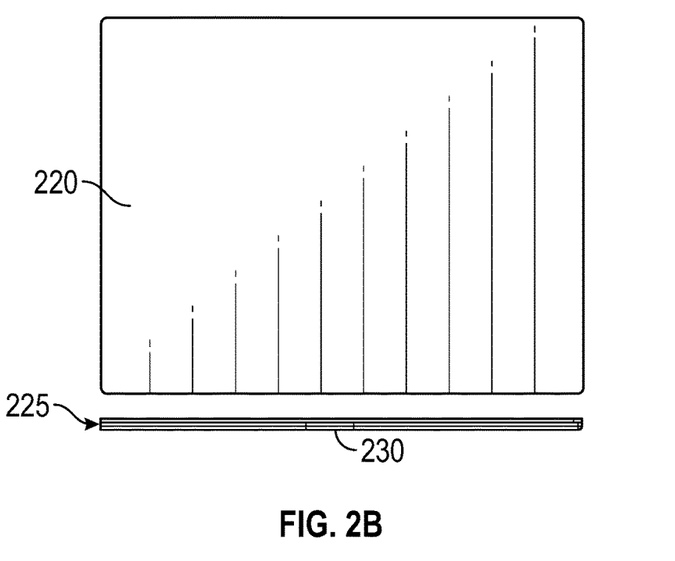
FIG. 2B is an illustration of a foldable IHS that is physically configured in a fully open posture.

FIG. 2B is an illustration of a foldable IHS that is physically configured in a fully open posture. Configured in this posture, the foldable display 220 is operational and provides the maximum available display area. In FIG. 2B, the foldable IHS is illustrated in a landscape orientation, in which the longest side of the display is horizontal. The foldable IHS may also be oriented in a portrait orientation, in which the longest side of the display is vertical. As illustrated in the profile view 225, in the fully open posture, the central fold 230 is opened to approximately 180 degrees. In this posture, the foldable IHS may be laid flat on a surface, propped up on a stand, or docked. In certain instances, a dock for use with a foldable IHS may include a cradle in which the foldable IHS may be placed while in a fully open posture such that the foldable IHS may remain in use while docked.

Figure 2C:
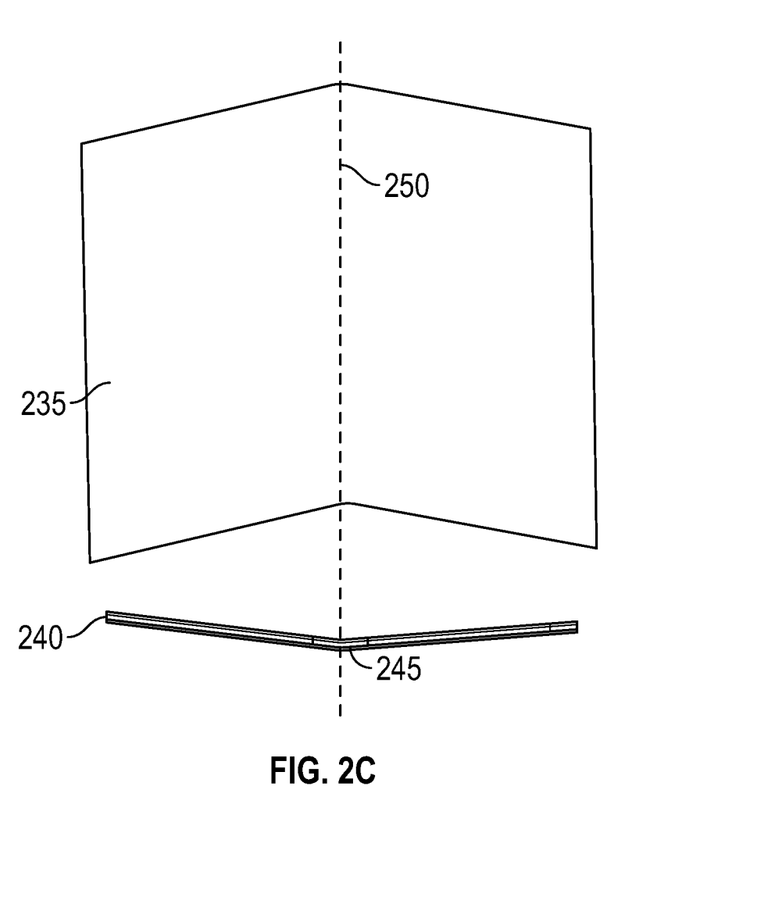
FIG. 2C is an illustration of a foldable IHS that is physically configured in a partially open posture.

FIG. 2C is an illustration of a foldable IHS that is physically configured in a partially open posture. As illustrated in the profile view 240, in the partially open posture, the central fold 245 is opened less than 180 degrees. The display 235 is divided into two portions along the fold 250 created by rotation of a hinge or other structure of the central fold 245. When partially open, the foldable IHS may be stood upright on a flat surface (e.g., similar to a hinged pair of picture frames that may be stood upright for display) or may be held by user in a manner similar to a book. Despite the fold 250 in the display 235, the entire foldable display 235 may remain functional. However, the content displayed along the length of the fold 250 may be distorted. In addition, as the display is folded further towards a closed position, the content displayed along the length of the fold 250 may become more difficult for a user to see. A similar effect is present in books that have an insufficient inner margin separating the text from the spine of the book.

Figure 3A:
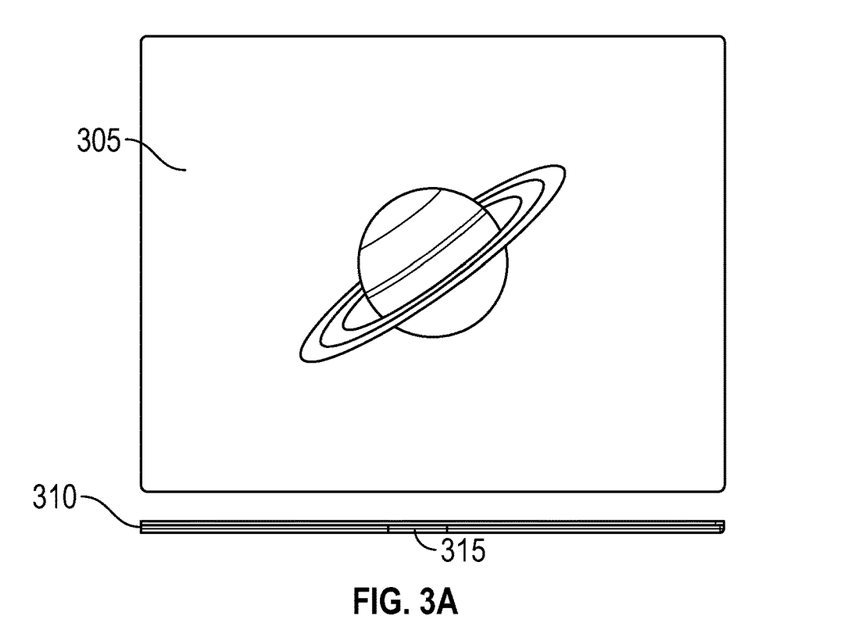
FIG. 3A is an illustration of a foldable IHS in a fully open posture utilizing a single-screen display.

FIG. 3A is an illustration of a foldable IHS that is configured in a fully open posture and for use of a single-screen display. As described with regard to FIG. 1, embodiments of a foldable IHS may include capabilities for determining the posture in which a foldable IHS is physically configured. For instance, the posture of the foldable IHS may be determined based on sensor information providing the angle at which the display is folded and information regarding the orientation, position and movement of the foldable IHS. Based on such posture information, a screen mode may be determined that is appropriate for a particular posture. For instance, in FIG. 3A, the foldable IHS is in a fully open posture such that the display 305 is fully unfolded. As illustrated in the profile view 310, the hinge 315 supporting a central fold is opened to 180-degrees such that the foldable IHS may be laid on a flat surface, propped upwards, or docked. As illustrated, in such a configuration, foldable display 305 may be utilized as a single screen that uses the full display 305.

Figure 3B:
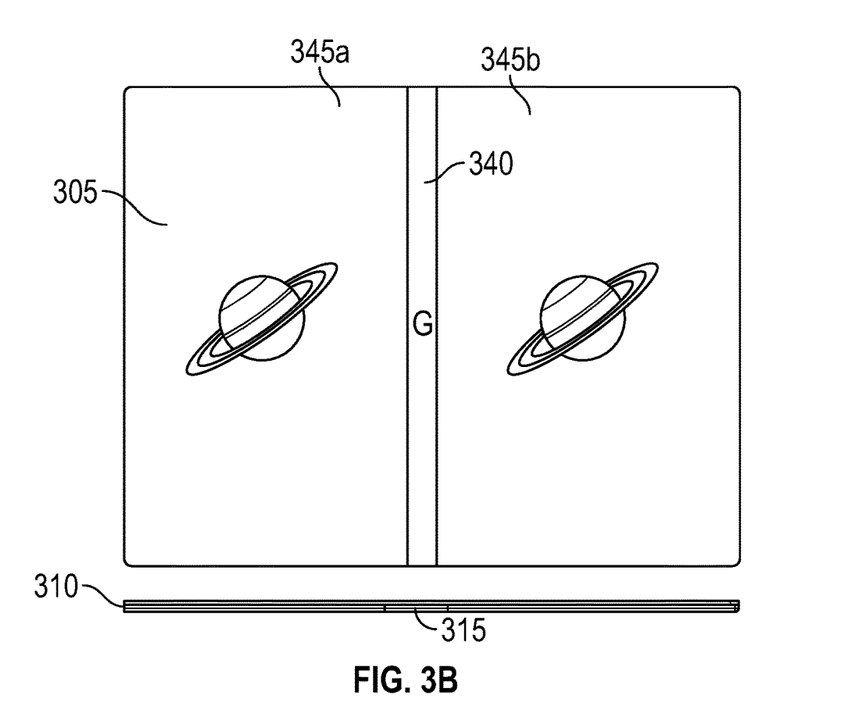
FIG. 3B is an illustration of a foldable IHS in a fully open posture while utilizing a dual-screen display.

FIG. 3B is an illustration of a foldable IHS that is configured in a fully open posture and for use of a dual-screen display. As reflected in the profile view 310, the foldable IHS remains in a fully open posture with the hinge 315 in a fully open position and the display 305 fully unfolded. Whereas in FIG. 3A, the display 305 is used for a single screen, in FIG. 3B, the display 305 is divided into two screen portions 345a-b. As described in additional detail with regard to FIG. 4, a foldable IHS may determine the application content to display in each of the screen portions 345a-b based on considerations such as the posture of the foldable IHS and the applications that are currently being used to display content. In addition, a foldable IHS according to embodiments may mitigate screen burn-in of the screen portions 345a-b through separately shifting the content displayed in each of these dual-screen portions and also through modification of a patent of pixel display outputs that are used to display the gap 340 separating the screen portions 345a-b.

In certain instances, the foldable IHS may be configured to split the display along the central fold 315 such that each of the portions 345a-b may be utilized as a separate screen. In some instances, the foldable IHS may be configured such that content from different applications may be shown in each of the portions 345a-b. For instance, a text editing application may be shown in the left-hand portion 345a and a web browser may be shown in the right-hand portion 345b. However, in certain instances, the foldable IHS may be configured such that content from a single application is shown in both portions 345a-b of the display 305. For instance, a reading application may show a page of text in the left-hand portion 345a and the following page of text in the right-hand portion 345b, similar to a conventional book.

The determination regarding whether to utilize the display 305 in a single screen or dual screen configuration may be based on the application that is currently selected for display by the user. For instance, applications for gaming or streaming video may indicate use of a single screen, such as in FIG. 3A. However, concurrent use of different applications (e.g., a photo editing application and a web browser) or use of a reading application may indicate use of dual screens, such as in FIG. 3B. As described in detail with regard to FIGS. 3D and 4, the two screen portions 345a-b may be separated by a gap 340 that is a separator, such as a suitable pixel pattern, that is displayed by the foldable display along the length of the hinge 315.

Figure 3C:
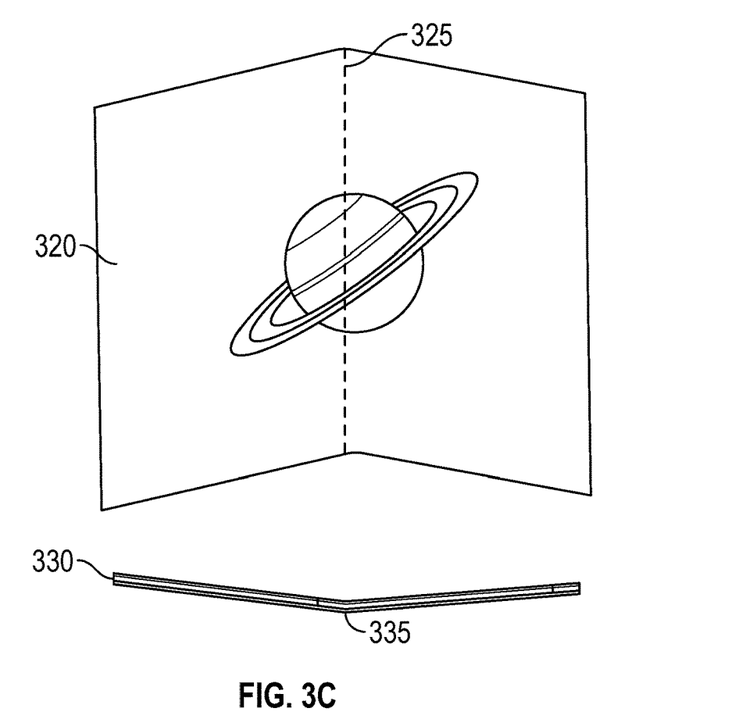
FIG. 3C is an illustration of a foldable IHS in a partially open posture utilizing a single-screen display.

FIG. 3C is an illustration of a foldable IHS that is configured in a partially open posture and utilizing a single-screen display. As in the partially open posture of FIG. 2C, the profile view 330 illustrates the partially open hinge 335 that results in a fold 325 in the display 320. Similar to the single-screen display utilized in the fully open posture of FIG. 3A, the full display 320 may be utilized as a single-screen despite the fold 325 in the display 320. Embodiments may configure the single-screen use of the foldable IHS as illustrated in FIG. 3C based on the applications being displayed by the user. For instance, the display of a streaming video player may result in the full single-screen display of the video content as long as the screen is folded less than a certain threshold.

Figure 3D:
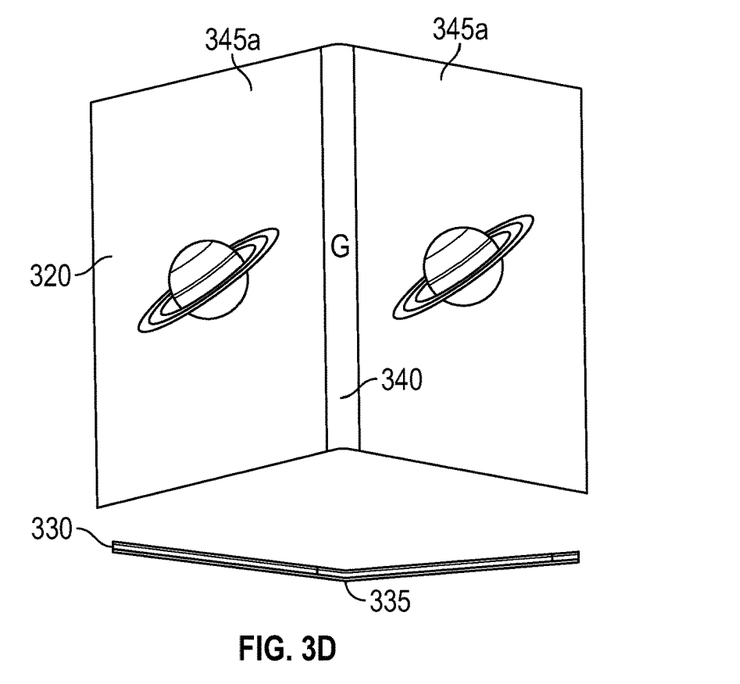
FIG. 3D is an illustration of a foldable IHS in a partially open posture while utilizing a dual screen display.

FIG. 3D is an illustration of a foldable IHS that is configured in a partially open posture while utilizing a dual-screen display. As described, the ability for the user to properly view content displayed along the length of a fold may be compromised to different degrees based on the angle at which the display is folded and by the application that is being used to display information. Accordingly, as described with regard to FIG. 3D, the folded display 320 may be divided into two portions 345a-b along the length of fold created through bending the display 320 at the central hinge 335. Also as described, the two portions 345a-b of the folded display 320 may be separated by a gap 340 that runs along the length of the fold 325. The displayed gap 340 serves to separate the content of each screen portion 345a-b. In certain instances, each of the portions 345a-b may be treated as separate, non-interacting displays such that content from one portion cannot be moved to another portion through a user input such as via drag-and-drop mouse operations. In other instances, each of the portions 345a-b may be treated as portions of an extended display that is separated by gap 340 and that allows for content to be moved between two portions 345a-b.

In scenarios where the current posture of the foldable IHS indicates the use of a dual-screen mode, such as illustrated in FIG. 3B, the portions 345a-b of the display resulting from the fold may be separated by a gap 340 that is displayed along the length of the fold in the display 305. In certain embodiments, the gap 340 may be a rectangular shape or image that is displayed along the length of the fold 325 of the folded display 305. For instance, the gap 340 may be generated through display of a rectangular pattern that may be positioned along the length of the fold such that the gap 340 is centered above the hinge 335. Various embodiments may employ various techniques for displaying the gap 340 that separates the display 305 into two screen portions 345a-b.

As described, foldable displays 305 utilizing OLED display technologies may be vulnerable to experiencing screen burn-in. In displaying a gap 340 that separates the screen portions 345a-b, a pattern or other type of image may be displayed along the fold of the foldable display 305. If this pattern or image is displayed for a prolonged period of time, significant screen burn-in may occur within the pixels of the foldable display 305 that are used to display the gap. When in dual-screen mode such that a gap 305 is present, one of the portions 345a-b may be predominately utilized such that the content displayed in the other portion may remain relatively static for prolonged periods. Accordingly, foldable displays may be particularly susceptible to screen-burn in, both in the gaps separating portions of the screens and in the individual screen portions.

Figure 4:
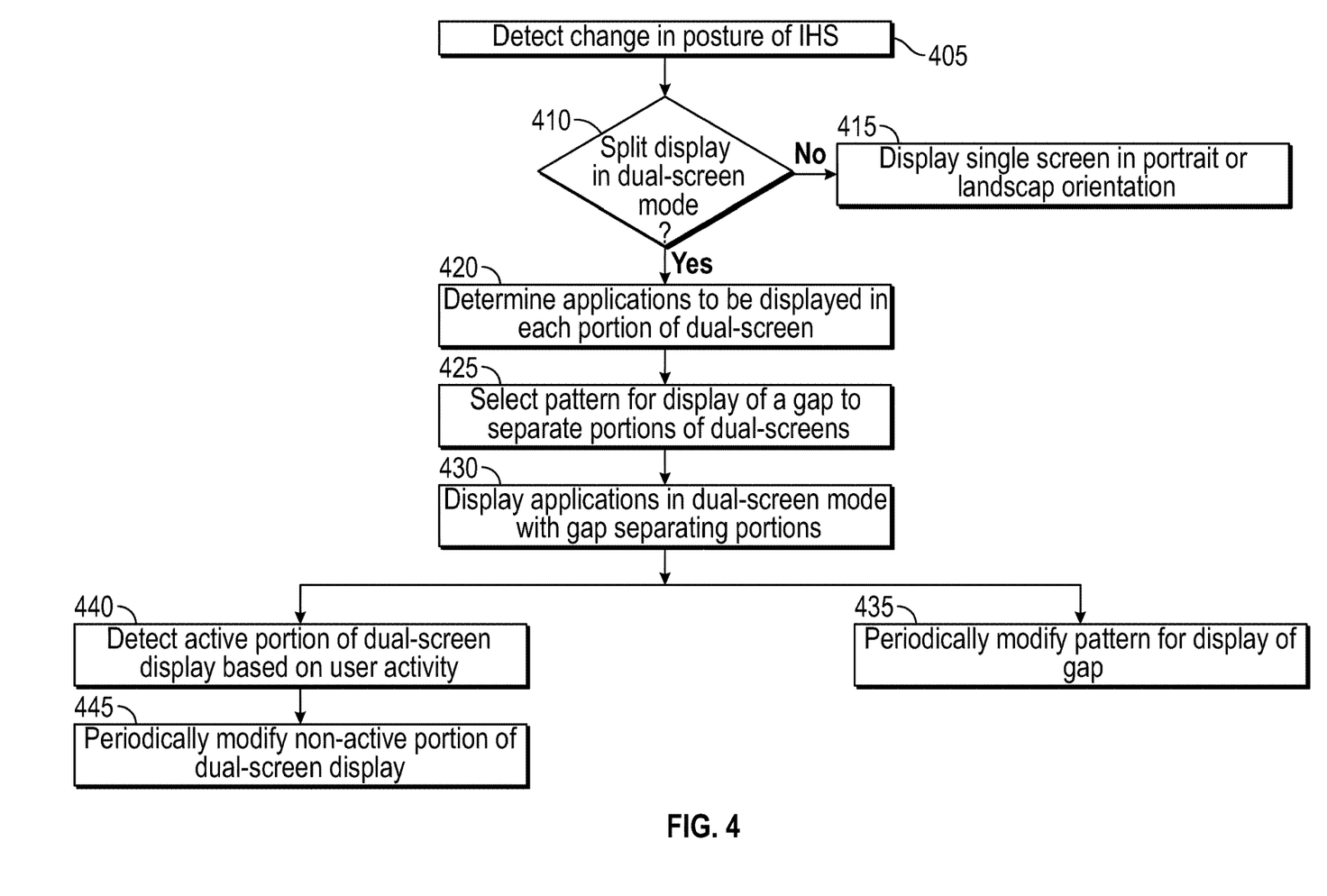
FIG. 4 is a flowchart describing certain steps of a process according to various embodiments for mitigation of screen burn-in of a foldable display of an IHS.

FIG. 4 is a flowchart describing certain steps of a process according to various embodiments for mitigation of screen burn-in of a foldable display of an IHS. As described, a foldable IHS may include various capabilities for detecting changes to the posture in which the foldable IHS is physically configured for use. For instance, a foldable IHS utilizing a hinge or other mechanical structure to support folding of the IHS may utilize a hinge angle sensor to detect any folding or unfolding of the IHS. As described with regard to FIG. 1, a sensor hub and/or an embedded controller may determine a posture of the foldable IHS based in part on the reported hinge angle. For instance, a fully folded hinge angle may correspond to a closed posture, such as illustrated in FIG. 2A, a partially folded hinge angle may correspond to a partially open posture, such as illustrated in FIG. 2C, and a fully open hinge angle may correspond to a fully open posture, such as illustrated in FIG. 2B.

In addition to tracking the folding and unfolding of the IHS the posture of the foldable IHS may be based on the positioning of the foldable IHS. For instance, the movement of a foldable IHS to the partially open book posture of FIG. 2C may be determined based on detected movements indicating the foldable IHS is being held by a user in a partially open configuration with the foldable IHS oriented such that the fold is vertical. Additional indications of use of the foldable IHS in a book posture may be indicated through detection of a central axis of symmetry of the user's face in approximate alignment with the axis of the fold of the IHS. As described, the foldable IHS may also utilize sensors capable of detecting when the IHS is motionless and has been placed on a flat surface or has been propped such that the display faces the user.

In certain instances, a foldable IHS may be docked either through a wired coupling, such as a USB-C connection, or via a cradle that receives the foldable IHS. An embedded controller of the foldable IHS may detect changes to the docking status of the IHS. In certain foldable IHSs that utilize a docking cradle, the foldable IHS may remain usable while docked, but may be limited to a specific posture supported by the cradle, such as the fully open posture of FIG. 2B. Accordingly, a docking status of the foldable IHS may dictate the posture in which the IHS may be configured and may also dictate the orientation of the IHS.

In response to detecting any of such types of changes in the use of the IHS, at block 405, the current posture of the IHS may be determined. Once the posture of the foldable IHS is determined the applications currently being used to display information are determined. In certain instances, consideration may be given to all applications with graphical user interfaces that are currently visible to a non-negligible degree in the display. In other instances, considerations may be given only to applications determined to occupy at least a specific portion of the operating system desktop and that are also actively in use. Where multiple applications are concurrently visible on the operating system desktop, the applications that are actively in use may be determined based on the percentage of the desktop that is being used to display each of the applications. Applications occupying only negligible portions of the desktop may be considered an inactive, while applications occupying large portions of the desktop may be considered active. Other indications of applications that are actively in use may be determined based on the recency of inputs to a user interface of the applications.

Once the active applications are determined, any displayed preferences for the active applications may be identified. In certain scenarios, different applications may be associated with different display preferences. For instance, applications for watching streaming video or for gaming may be associated with a preference for display using a single-screen mode, even if the display is partially folded and some distortion will occur along the length of the fold. However, such preferences may also specify that if the IHS is folded beyond a certain threshold, then display of the streaming video or gaming content via dual-screen mode is preferred. Similarly, a text editing, spreadsheet, document viewer or graphic design application may be associated with a preference for single-screen mode as long as the IHS is in a fully open posture, but may prefer display via a dual-screen mode if the display is in a partially open posture. As described, a reading application may be associated with a full-screen mode in scenarios where the foldable IHS is fully open and oriented in a portrait orientation, but may be associated with a dual-screen mode where the IHS is oriented in a landscape orientation, regardless of whether the IHS is in a fully open posture or a partially open posture.

Based on the display preferences of the visible applications and further based on the current posture of the foldable IHS, at block 410, embodiments may determine whether to split the foldable display into a dual-screen mode operation. In certain scenarios, a single-screen display may be selected instead of a dual-screen display. For instance, in a scenario where the foldable IHS is in a fully open posture and the display preferences of the predominantly visible application indicate a preference for a single-screen display, at block 415, embodiments may determine to utilize the display in a single-screen mode. If use of a single-screen is determined, based on the orientation of the foldable IHS relative to the user, embodiments may further determine whether to display the single-screen in a landscape or portrait orientation.

In other scenarios, a dual-screen display may be selected based on the posture of the foldable IHS and the applications that are being displayed. For instance, certain applications may be associated with preference for use of a dual-screen display as soon as the display is folded beyond a certain point. In one example, an application may be associated with a preference for use of dual-screen displays anytime the display is opened less than 150 degrees from a closed posture. As described, a dual-screen display may be selected under various postures of the foldable IHS and the applications that are displaying content.

In instances where the current posture of the foldable IHS and the display preferences associated with the visible applications indicate the use of a dual-screen mode, at block 420, embodiments may determine the applications to display in each of the portions of the dual-screen display. For instance, in scenarios where two applications are determined to be actively in use and visible within the operating system desktop, embodiments may assign each of the two applications to a separate screen of the two dual-screen portions. In scenarios where one application is determined to be predominantly in use and other applications are also actively used to a lesser extent, embodiments may assign the predominantly used application for display to one dual-screen display while the other active applications are displayed as tiled windows within the other dual-screen display. In scenarios where the application in use is a reading application and the foldable IHS is configured in a book posture, both of the dual-screen displays may be used for display by the reading application.

In certain embodiments, an IHS may implement the described dual-screen display capabilities via separate graphics processes that each support the display of content in one of the screen portions. The separate graphics processes may operate according to the graphics capabilities of the underlying operating system of the IHS and may thus interoperate as described, such that the user may move content between the display portions in a manner similar to an extended display. As described in additional detail below, the use of separate graphics processes for each screen portion of a folded display supports a capability by which a screen burn-in mitigation procedure may be executed by the graphics process for an inactive screen portion while another graphics process simultaneously displays the content that is actively in use in an active screen portion of the folded display.

As described, when configured for dual-screen displays, the portions of the display used for each of the screens may be separated by a gap that is displayed by the foldable IHS along the length of the fold. In certain embodiments, a gap may be displayed through the display of a pattern or other type of image along the length of the fold that separates the display into the dual-screens. At block, 425, the pattern or other type of image to be displayed as a gap is selected. In certain embodiments, the pattern may specify a pattern of display outputs for the pixels that are being used to display a gap. In certain instances, the pattern may appear to a user as a solid rectangular block of uniform color. However, such pixel patterns may nonetheless include variations in the pixel outputs, such as variations in color, that are imperceptible to a user. In other instances, a pattern may be utilized where certain aspects of the pattern are discernible by a user, such as a pattern comprised of lines of pixels of alternating shades of a particular color. Various other types of patterns may be utilized for the display of a gap.

Once a pattern has been selected for displaying a gap, at block 430, the pattern is displayed by the pixels along the length of the fold of the foldable display. In certain embodiments, the width of the displayed gap may vary based on the angle at which the display is folded. Displayed in this manner, the pattern creates a gap that separates the portions of the foldable display. However, as described, prolonged display of such a pattern may result in screen burn-in within the pixels of the foldable display that are used to display the gap. Even though the size of a displayed gap may be modified in response to changing the angle at which a foldable display is folded, a gap may nonetheless be displayed for long periods of time. Accordingly, at block 435, the pattern used to display the gap may be periodically modified in a manner that prevents burn-in of the displayed gap.

In certain embodiments, the patterns to be displayed as a gap may be selected from a buffer that specifies a library of patterns that may be utilized to display a gap of particular dimensions. In certain embodiments, the periodic modifications to a gap may be implemented by cycling through the buffer that specifies the library of available patterns. In some embodiments, the periodic modifications of the pattern used to display a gap may be synchronized or otherwise matched to the refresh rate of the foldable display. For instance, with each refresh of the foldable display, a pattern for refreshing the gap may be selected from the buffer, with the selections iteratively cycling through each of the patterns maintained in the buffer. In certain embodiments, instead of updating the gap pattern with every refresh of the foldable display, patterns may be selected from the buffer and used to refresh the displayed gap at regular intervals that are compatible with frame refresh rate of the foldable display. In this manner, the pattern used to display the gap may be modified with sufficient frequency to prevent burn-in and without being perceptible to the user.

In some embodiments, a gap may be periodically modified through random modifications to the pixels used to display the gap. For instance, at periodic intervals a selection of the pixels used to display a gap may have their display outputs randomly adjusted within a range of display outputs. In certain of such embodiments, these ranges of display outputs may be selected such that variations within a range are imperceptible, or at least non-distracting, to a user viewing the foldable display. For instance, the range of display outputs may specify a range of colors from true black to gray that may be used to display a gap that is perceived as a rectangle of a uniform color. When selected from such a range, the display outputs of pixels used to display the gap may be periodically adjusted sufficient to prevent screen burn-in, with these adjustments remaining imperceptible to a user. In certain embodiments, pixels used to display a gap may be periodically selected at random for such modifications. In other embodiments, pixels may be selected systematically for such periodic modifications.

In addition to preventing screen burn-in of the gap portion of a folded display, embodiments may also mitigate the effects of screen burn-in within the dual-screen portions of the folded display. In certain embodiments, such mitigation procedures may be employed on portions of the folded display that are not actively in use. At block 440, the portion of a folded display that is actively in use may be identified. Even though a user may regularly refer to content displayed in both portions of a folded display, a user typically only views one of these portions at a time. Accordingly, in some embodiments, the portion of a dual-screen display that is actively in use may be determined by tracking the gaze of the user. As described with regard to FIG. 1, an IHS may utilize sensors capable of tracking the direction of the user's gaze, thus providing the ability to determine the portion of the foldable screen on which the user's vision is directed. Based on such gaze information, one of the portions of the foldable screen may be designated as an active portion.

In certain embodiments, an active screen portion may be additionally or alternatively determined based on other types of user activity. For instance, by detecting the application windows that are receiving mouse, keyboard, touchscreen and/or voice inputs form the user, the portion of a foldable display that is actively in use may be further determined. In certain embodiments, an active screen portion may be determined based on a user's gaze and confirmed using the detection of such additional user inputs. Once a screen portion has been designated as the active screen portion, the other portion(s) of the foldable display are designated as inactive screen portions.

At block 445, the screen portions designated as inactive may be periodically modified in a manner that mitigates screen burn-in. With the user's attention focused on an active screen portion, modifications may be made to the inactive screen portions without the user's awareness. For instance, in certain embodiments, the content displayed within inactive screen portion may be periodically shifted such that the shifting is imperceptible to the user focusing on the active screen portion. Other embodiments may utilize various other techniques for modifying the content of the inactive screen portion in a manner that mitigates screen burn-in and that is not perceptible to a user focusing on an active screen portion.

As described, certain embodiments may utilize separate graphics processes for managing the display of content in each of the screen portions that result from folding of the display. In certain of such embodiments, the graphics process for each portion of the folded display may utilize a technique or procedure for preventing screen burn-in that is suited to the content being displayed in the respective portion of the foldable display. For instance, in a dual-screen display in which a reading application is used to display text in both screen portions, the graphics process for each portion may implement the same technique for preventing screen burn, such as the described periodic shifting of pixel outputs. However, in a scenario where text is displayed in one portion of a foldable display and streaming video is displayed in another portion, the graphics process of the screen portion displaying the text may utilize screen shifting while the graphics process displaying the streaming video in the second screen portion may utilize a different technique that is only activated if the streaming video is detected as being paused or otherwise stopped.

The described embodiments support a foldable display with a single, central fold. However, additional embodiments may support a foldable display with multiple folds. For instance, a foldable IHS according to embodiments may include two hinges that allow the foldable display two be divided into three portions by the folds. In the same manner as described herein, a screen mode may be determined such that a single-screen display may be utilized (with this single-screen display potentially including two folds) if the foldable IHS is in a partially open or fully open posture. Based on the applications in use and the angles of the folds, a tri-screen display may be utilized, with each of the three screen portions separated by gaps running the length of the folds. Also, in the same manner as described herein, screen burn-in may be mitigated by periodically modifying each of the displayed gaps and/or through periodic modification of content displayed in inactive portions of the folded display.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising: a foldable display folded along a folded portion into a first screen portion and a second screen portion; a logic unit configured via firmware instructions to determine a posture of the IHS; and a processor configured via software instructions to: determine, based on the posture, content to display in the first screen portion and content to display in the second screen portion; designate the first screen portion or the second screen portion as an active screen portion based on detected user activity; designate as an inactive screen portion the first screen portion or the second screen portion that is not designated as the active screen portion; and within the inactive screen portion, periodically select at random pixel outputs of the content displayed in the inactive screen portion, wherein the periodic select of the content displayed in the inactive screen portion is not perceptible to the user and prevents screen burn-in in the inactive screen portion.

2. The IHS of claim 1, wherein the logic unit is further configured by the firmware instructions to determine whether the detected user activity is directed at the first screen portion or the second screen portion, and wherein the screen portion to which the user activity directed is designated as the active screen portion.

3. The IHS of claim 2, wherein the logic unit is further configured to detect a gaze of the user.

4. The IHS of claim 3, wherein the logic unit is further configured to determine whether the user activity is directed at the first screen portion or the second screen portion based on a direction of the gaze of the user.

5. The IHS of claim 4, wherein the direction of the gaze of the user is determined based on images captured by a camera of the IHS.

6. The IHS of claim 2, wherein the detected user activity comprises user inputs directed at the first screen portion or the second screen portion.

7. The IHS of claim 1, wherein the processor is further configured via software instructions to initiate a first graphics process that controls display of content in the first screen portion and mitigates screen burn-in in the first screen portion using a first technique and to initiate a second graphics process that controls display of content in the second screen portion and mitigates screen burn-in in the second screen portion using a second technique.

8. The IHS of claim 7, wherein the first graphics process utilizes a first shifting technique to mitigate screen burn-in based on a type of the content displayed in the first screen portion and the second graphics process utilizes a second shifting technique to mitigate screen burn-in based on a type of the content displayed in the second screen portion.

9. A method for mitigation of screen burn-in of a foldable display of an IHS (Information Handling System), the method comprising: detecting the foldable display being folded along a folded portion into a first screen portion and a second screen portion; determining a posture of the IHS, wherein the posture is determined based in part on an angle at which the display is folded along the folded portion; determining, based on the posture, content to display in the first screen portion and content to display in the second screen portion; designating the first screen portion or the second screen portion as an active screen portion based on detected user activity; designating as an inactive screen portion the first screen portion or the second screen portion that is not designated as the active screen portion; and within the inactive screen portion, periodically selecting at random pixel outputs of the content displayed in the inactive screen portion, wherein the periodic selecting of the content displayed in the inactive screen portion is not perceptible to the user and prevents screen burn-in in the inactive screen portion.

10. The method of claim 9, further comprising determining whether detected user activity is directed at the first screen portion or the second screen portion, and wherein the screen portion to which the user activity directed is designated as the active screen portion.

11. The method of claim 10, further comprising detecting a gaze of the user.

12. The method of claim 11, further comprising determining whether the user activity is directed at the first screen portion or the second screen portion based on a direction of the gaze of the user.

13. The method of claim 10, wherein the detected user activity comprises user inputs directed at the first screen portion or the second screen portion.

14. The method of claim 9, further comprising initiating a first graphics process that controls display of content in the first screen portion and mitigates screen burn-in in the first screen portion using a first technique and initiating a second graphics process that controls display of content in the second screen portion and mitigates screen burn-in in the second screen portion using a second technique.

15. The method of claim 14, wherein the first graphics process utilizes a first shifting technique to mitigate screen burn-in based on a type of the content displayed in the first screen portion and the second graphics process utilizes a second shifting technique to mitigate screen burn-in based on a type of the content displayed in the second screen portion.

16. A computer-readable storage device of an IHS (Information Handling System), where the storage device comprises program instructions stored thereon that, upon execution by a one or more processors, cause the one or more processors to: detecting a foldable display of the IHS being folded along a folded portion into a first screen portion and a second screen portion; determine a posture of the IHS, wherein the posture is determined based in part on an angle at which the display is folded along the folded portion; determine, based on the posture, content to display in the first screen portion and content to display in the second screen portion; designate the first screen portion or the second screen portion as an active screen portion based on detected user activity; designate as an inactive screen portion the first screen portion or the second screen portion that is not designated as the active screen portion; and within the inactive screen portion, periodically selecting at random pixel outputs of the content displayed in the inactive screen portion, wherein the periodic selecting of the content displayed in the inactive screen portion is not perceptible to the user and prevents screen burn-in in the inactive screen portion.

17. The storage device of claim 16, wherein execution of the instructions further causes the one or more processors to determine whether detected user activity is directed at the first screen portion or the second screen portion, and wherein the screen portion to which the user activity directed is designated as the active screen portion.

* * * * *

UNITED STATES PATENT AND TRADEMARK OFFICE
CERTIFICATE OF CORRECTION

| | | |
|---|---|---|
| PATENT NO. | : 11,423,860 B2 | Page 1 of 1 |
| APPLICATION NO. | : 17/318294 | |
| DATED | : August 23, 2022 | |
| INVENTOR(S) | : Iyer et al. | |

It is certified that error appears in the above-identified patent and that said Letters Patent is hereby corrected as shown below:

In the Claims

In Column 17, Line 21, Claim 1, delete "portion, wherein the periodic select of the content displayed" and insert -- portion, wherein the periodic selecting of the content displayed -- therefor.

Signed and Sealed this
Twenty-seventh Day of September, 2022

Katherine Kelly Vidal
Director of the United States Patent and Trademark Office